United States Patent
Savignac et al.

(10) Patent No.: US 8,456,313 B2
(45) Date of Patent: Jun. 4, 2013

(54) NUCLEAR RADIATION-WARNING DETECTOR THAT MEASURES IMPEDANCE

(76) Inventors: Noel Felix Savignac, Albuquerque, NM (US); Leo S. Gomez, Albuquerque, NM (US); William Graham Yelton, Sandia Park, NM (US); Alex Robinson, Albuquerque, NM (US); Steven Limmer, Albuquerque, NM (US)

(*) Notice: Subject to any disclaimer, the term of this patent is extended or adjusted under 35 U.S.C. 154(b) by 627 days.

(21) Appl. No.: 12/655,173

(22) Filed: Dec. 24, 2009

(65) Prior Publication Data
US 2011/0156916 A1 Jun. 30, 2011

(51) Int. Cl.
*G08B 17/12* (2006.01)
*H05G 1/42* (2006.01)
*G01T 1/185* (2006.01)

(52) U.S. Cl.
USPC .............. 340/620; 340/600; 378/97; 250/389

(58) Field of Classification Search
USPC ..... 340/500, 517, 521, 600, 620; 250/390.02, 250/390.03, 370.05, 370.07, 389, 370.01, 250/385.1; 376/153, 254; 435/33, 173.1, 435/173.4, 287.1, 288.4; 436/57, 58; 378/97, 378/177
See application file for complete search history.

(56) References Cited

U.S. PATENT DOCUMENTS

| | | | | |
|---|---|---|---|---|
| 2,696,564 A | * | 12/1954 | Ohmart | 250/389 |
| 3,137,792 A | * | 6/1964 | Staples et al. | 376/153 |
| 3,238,370 A | * | 3/1966 | Leeds, Jr. | 376/254 |
| 3,483,379 A | * | 12/1969 | Brewster | 378/97 |
| 4,366,235 A | | 12/1982 | Land | |
| 4,641,037 A | | 2/1987 | Butler et al. | |
| 6,218,668 B1 | * | 4/2001 | Luke | 250/370.01 |
| 6,764,583 B2 | | 7/2004 | Miles | |
| 7,192,752 B2 | * | 3/2007 | Xu et al. | 435/173.1 |
| 8,026,080 B2 | * | 9/2011 | Wang et al. | 435/33 |
| 8,187,887 B2 | * | 5/2012 | Swager et al. | 436/58 |

* cited by examiner

Primary Examiner — Van T. Trieu

(57) ABSTRACT

This invention is a nuclear radiation-warning detector that measures impedance of silver-silver halide on an interdigitated electrode to detect light or radiation comprised of alpha particles, beta particles, gamma rays, X rays, and/or neutrons. The detector is comprised of an interdigitated electrode covered by a layer of silver halide. After exposure to alpha particles, beta particles, X rays, gamma rays, neutron radiation, or light, the silver halide is reduced to silver in the presence of a reducing solution. The change from the high electrical resistance (impedance) of silver halide to the low resistance of silver provides the radiation warning that detected radiation levels exceed a predetermined radiation dose threshold.

20 Claims, 1 Drawing Sheet

Nuclear Radiation-Warning Detector That Measures Impedance

Nuclear Radiation-Warning Detector That Measures Impedance
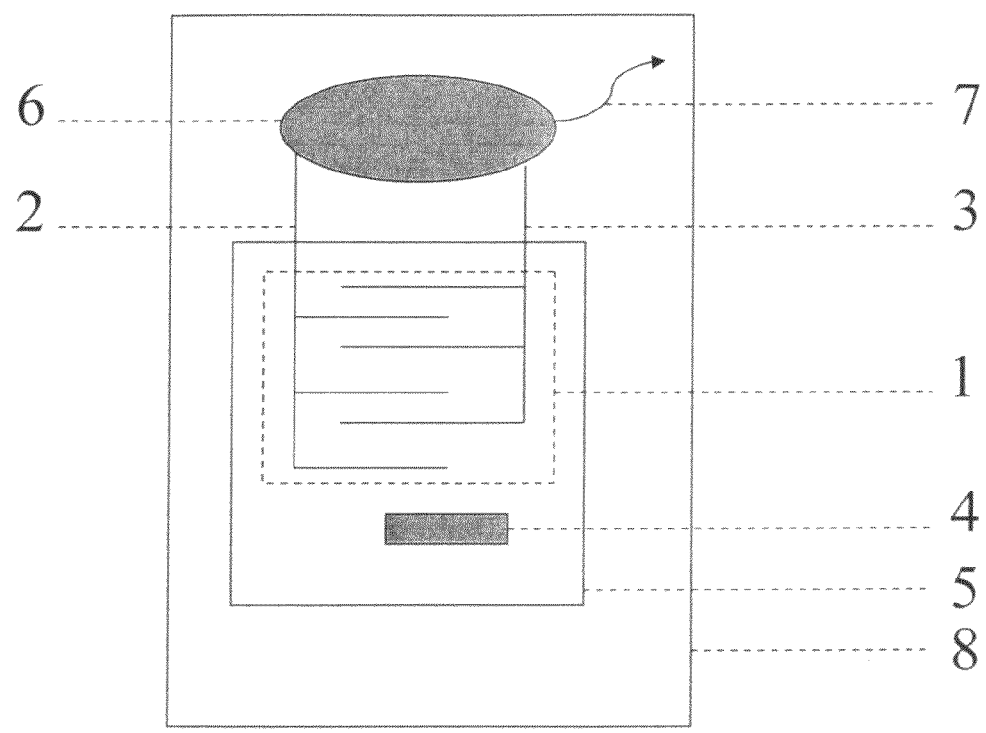

NUCLEAR RADIATION-WARNING DETECTOR THAT MEASURES IMPEDANCE

STATEMENT REGARDING STATE SPONSORED R & D

This invention was made with Government support under Contract No. 00 DE-AC04-94-AL85000 awarded by the U.S. Department of Energy. The Government has certain rights in the invention.

STATEMENT REGARDING INTELLECTUAL PROPERTY

The inventors of this patent claimed "title" to the intellectual property arising out of work on the detector conducted at Sandia National Laboratories under the New Mexico Small Business Assistance Program.

BACKGROUND OF INVENTION

1. Field of the Invention

A nuclear radiation detector of alpha particles, beta particles, gamma rays, X rays and neutrons using the electrical impedance measurements of an interdigitated electrode. The detector is best used to monitor the radiation from cargo containers or for personnel radiation monitoring to determine that radiation doses exceeded a predetermined radiation dose threshold.

The present invention relates to a radiation-warning detector that provides a rapid warning of radiation coming from cargo containers or a rapid warning that personnel have been exposed to radiation in excess of predetermined doses.

2. Description of Prior Art

An immediate response, simple to use, inexpensive radiation-warning detector is needed to monitor alpha particles, beta particles, gamma rays, X rays, neutrons, and/or light using impedance measurements from an interdigitated electrode.

U.S. Pat. No. 4,641,037, Feb. 3, 1987, describes a detector for detecting neutrons comprised of a layer of conductive polymer sandwiched between electrodes. It is hypothesized that the interaction between a neutron and the conductive organic polymer results in the displacement of protons due to the relatively large cross-section of hydrogen atoms for fast neutrons. The resultant measurable change in the properties of the polymer, most notably the electrical conductivity, can be directly measured, preferably electronically, thereby providing a qualitative and/or quantitative assessment of the neutron flux. This prior art is deficient with respect to the present invention in that this detector monitors only neutron radiation using a conductive organic polymer.

U.S. Pat. No. 6,764,583 B2, Jul. 20, 2004, describes the use of resistance (impedance) measurements to detect the presence of pathogens trapped in an electric field. The apparatus involves interdigitated electrodes located on the inner surface of a fluidic channel through which a sample is passed and pathogens are trapped by the dielectrophoretic force. By determining the impedance change, the amount of trapped pathogen can be determined. This prior art is deficient with respect to the present invention in that this detector detects pathogens.

U.S. Pat. No. 4,366,235, Dec. 28, 1982, describes a photosensitive element comprising a support carrying photosensitive silver halide grains in a substantially predetermined spaced array and methods of forming such photosensitive elements. This prior art is deficient with respect to the present invention in that this detector describes a silver-halide photosensitive detector that detects light.

All of the above patents are deficient with respect to the present invention in that they do not address the conversion of silver halide by alpha particles, beta particles, gamma radiation, X rays, neutrons or light to silver and the measurement of resistance (impedance) of silver halide to detect nuclear radiation or light.

SUMMARY OF INVENTION

An object of this invention is to provide a radiation-warning detector that is based on the chemical amplification of a change in resistance (impedance) of a silver halide on an interdigitated electrode responding directly to nuclear radiation.

Another object of this invention is to provide an immediate warning of radiation compared to a read-out time of days to weeks for other types of radiation detectors such as thermoluminescent dosimeters.

Another object of this invention is to provide a nuclear radiation warning with a detector of minimal cost (estimated less than $1 in 2009 dollars) and minimal size (approximately 1"W×1"L×0.25'thick).

Upon further study of the specification and claims, further objects and advantages of this invention will become apparent to those skilled in the art.

BRIEF DESCRIPTION OF THE DRAWINGS

FIG. 1 is a top view of the radiation-warning detector.

DETAILED DESCRIPTION OF THE INVENTION

FIG. 1 is a top view of the best mode contemplated by the inventors of the radiation-warning detector according to concepts of the present invention. The radiation-warning detector is a detector that warns users that they have been exposed to nuclear radiation above predetermined radiation doses. Radiation doses are the energy deposited by nuclear radiation in an absorbing media. The Interdigitated Electrode 1 consists of Electrode 2 and Electrode 3. An interdigitated electrode is a pair of electrodes positioned next to one another like teeth of two opposing hair combs with the teeth pushed together but not touching.

Interdigitated Electrode 1 is comprised of gold or platinum and is coated with silver using a method comprised of a sputtered coating or chemical vapor deposition of silver. Sputtering is a method for adhering thin films onto a substrate by bombarding a target material with a charged gas (typically argon) which releases atoms in the target that coat the nearby substrate. Chemical vapor deposition is a process whereby a film is deposited by reacting chemicals together in the gaseous or vapor phase to form a film.

The silver on Interdigitated Electrode 1 is electrochemically anodized to silver halide with solutions comprised of potassium bromide (KBr) and/or potassium chloride (KCl) using low voltage for 1-600 seconds, or chemically converted to silver halide with a solution comprised of ferric chloride. Electrochemical reactions take place in a solution at the interface of an electron conductor (a metal or a semiconductor) and an ionic conductor (the electrolyte), and involve electron transfer between the electrode and the electrolyte.

The Interdigitated Electrode 1, and Container 4 of reducing agent are enclosed in a liquid-proof, light-proof Enclosure 5. Container 4 is comprised of a glass ampoule, or membrane that prevents the enclosed reducing agent from making contact with the interdigitated electrode until Container 4 is ruptured. The reducing agent in Container 4 is comprised of a photographic developer solution such as Kodak D-19. When the silver halide and the reducing solution combine, after being released from Container 4, the Electronic Data Transmitter 6 measures the electrical impedance (resistance) of the silver halide. Impedance is the total opposition to current flow of an alternating current circuit that is analogous to the actual electrical resistance of a direct current.

If the silver halide has not been exposed to radiation comprising gamma rays, X rays, beta, or neutron radiation of sufficient energy to penetrate the Enclosure 8, the measured resistance (impedance) is in the range of kilo-ohms to giga-ohms. Upon exposure to radiation or light penetrating Enclosure 8 or if an alpha-particle-emitting material in introduced into Enclosure 8 by methods comprising injection with a needle and syringe, the silver halide on Electrode 1 is converted to metallic silver. The reducing agent catalyzes the mass conversion of silver halide to metallic silver resulting in an electrical impedance of Interdigitated Electrode 1 in the range of 1-100 ohms. The change in impedance from very high to very low causes an Electronic Signal 8 to be transmitted from the Electronic Data Transmitter 6.

The Interdigitated Electrode 1, the reducing solution in Container 4, and the Electronic Data Transmitter 6 are all encased in an envelope 5. The nuclear radiation warning detector can be mounted on cargo containers to monitor for gamma rays, X rays, or neutrons inside the cargo container, and for those forms of radiation plus beta particles if mounted inside the cargo container. The detector is activated by breaking the integrity of Container 4. If radiation is detected, Transmitter 6 will produce a radiation warning comprised of turning on a light on Transmitter 7 and emitting an electronic signal.

If the radiation-warning detector is used on cargo containers entering the sea ports, the radiation warning serves as a screening device to segregate the cargo containers emitting radiation from the remainder of the cargo containers. Those containers emitting radiation can subsequently be monitored to identify the type of radioactive material inside the containers, either naturally-occurring or illicit radioactive material possibly comprising a dirty bomb.

The radiation-warning detector provides a rapid method of determining radiation exposures that allows cargo containers that do not emit radiation to pass through seaports rapidly. Personnel radiation exposures can be assessed within minutes as compared to using the integrating-type of radiation dosimeters that require days to weeks to analyze the radiation dose.

The radiation-warning detector described in this application is designed to be tamper proof. If the interdigitated electrode is destroyed by tampering, the detector will produce a radiation warning.

The radiation-warning detector can also provide an immediate determination when personnel radiation doses have exceeded a predetermined threshold without the need to ship the detectors off-site to be analyzed.

The present invention described above and FIG. 1 are not intended to limit the scope of the present invention. The scope of the present invention is only limited by the scope of the claims as set forth herein below.

What is claimed is:

1. A method of detecting alpha particles, beta particles, gamma rays, X rays, and neutron radiation comprising the steps of: measuring the decreased impedance (electrical resistance) caused by a chemical reduction of silver halide on an interdigitated electrode by a reducing agent (photographic developer) and radiation.

2. A method according to claim 1 in which the interdigitated electrode and a container of developer solution are enclosed in a liquid-tight, light-tight enclosure.

3. A method according to claim 2 in which developer solution can be released from the container of developer solution to react with the interdigitated electrode.

4. A method according to claim 3 in which the interdigitated electrode has been coated with silver using a method comprised of vapor deposition or sputtering.

5. A method according to claim 4 in which the silver on the interdigitated electrode is chemically or electrochemically converted to silver halide.

6. A method according to claim 5 in which the silver halide which has been exposed to radiation is reduced chemically to silver with a reducing reagent comprising Kodak D-19 developer causing a decrease in impedance.

7. A method according to claim 6 in which the low impedance of silver on the interdigitated electrode after exposure to radiation or light produces a radiation warning comprised of the illumination of a light and the transmission of an electronic signal that the detected radiation levels exceed a predetermined radiation dose threshold.

8. A method of detecting beta particles, gamma rays, X rays, or neutrons from cargo containers comprising the steps of: measurement of the decrease impedance (electrical resistance) caused by a chemical reduction of silver halide on an interdigitated electrode by a reducing agent (photographic developer) and radiation.

9. A method according to claim 8 in which the developer solution can be released from the container of developer solution to react with the interdigitated electrode.

10. A method according to claim 9 in which the interdigitated electrode has been coated with silver using a method comprised of vapor deposition or sputtering.

11. A method according to claim 10 in which the silver on the interdigitated electrode is chemically or electrochemically converted to silver halide.

12. A method according to claim 11 in which the silver halide which has been exposed to radiation is reduced chemically to silver with a reducing reagent comprising Kodak D-19 developer causing a decrease in impedance of the interdigitated electrode.

13. A method according to claim 12 in which the low impedance of silver on the interdigitated electrode after exposure to radiation or light produces a radiation warning comprised of the illumination of a light and the transmission of an electronic signal that the detected radiation levels exceed a predetermined radiation dose threshold.

14. A method according to claim 13 for screening cargo containers to segregate those containers that emit gamma, X, or neutrons from containers that do not emit gamma, X, or neutron radiation.

15. A method of detecting radiation doses from beta, gamma, X, or neutrons exposures to personnel comprising the steps of: measuring the decreased impedance (electrical resistance) caused by a chemical reduction of silver halide on an interdigitated electrode by a reducing agent (photographic developer) and radiation.

16. A method according to claim 15 in which the developer solution can be released from the container of developer solution to react with the interdigitated electrode.

17. A method according to claim 16 in which the interdigitated electrode has been coated with silver using a method comprised of vapor deposition or sputtering.

18. A method according to claim 17 in which the silver on the interdigitated electrode is chemically or electrochemically converted to silver halide.

19. A method according to claim 18 in which the silver halide which has been exposed to radiation is reduced chemically to silver with a reducing reagent comprising Kodak D-19 developer causing a decrease in impedance of the interdigitated electrode.

20. A method according to claim 15 in which the low impedance of silver on the interdigitated electrode after exposure to radiation or light produces a radiation warning comprised of the illumination of a light and the transmission of an electronic signal that the detected radiation levels exceed a predetermined radiation dose threshold.

* * * * *